(12) United States Patent
Kozmenko et al.

(10) Patent No.: US 8,393,905 B2
(45) Date of Patent: Mar. 12, 2013

(54) MEDICAL SIMULATION COMPUTER SYSTEM

(75) Inventors: Valeriy V. Kozmenko, Metairie, LA (US); Charles Winston Hilton, Jr., Slidell, LA (US)

(73) Assignee: Board of Supervisors of Louisiana State University and Agricultural and Mechanical College, New Orleans, LA (US)

( * ) Notice: Subject to any disclaimer, the term of this patent is extended or adjusted under 35 U.S.C. 154(b) by 967 days.

(21) Appl. No.: 11/015,127

(22) Filed: Dec. 17, 2004

(65) Prior Publication Data

US 2007/0111174 A1    May 17, 2007

(51) Int. Cl.
 *G09B 23/28* (2006.01)
(52) U.S. Cl. .......................................... 434/262
(58) Field of Classification Search .................... 434/262
 See application file for complete search history.

(56) References Cited

U.S. PATENT DOCUMENTS

| | | | |
|---|---|---|---|
| 3,520,071 A * | 7/1970 | Abrahamson et al. | 434/265 |
| 4,915,635 A * | 4/1990 | Ingenito et al. | 434/396 |
| 5,769,641 A * | 6/1998 | Lampotang et al. | 434/272 |
| 5,941,710 A | 8/1999 | Lampotang et al. | |
| 6,074,213 A | 6/2000 | Hon | |
| 6,638,073 B1 | 10/2003 | Kazimirov et al. | |

OTHER PUBLICATIONS

Medical Education Technologies, Inc., System Training Manual METI, United States of America, this revision of the manual was published prior to the publication of Revision 4 of the manual which was published Apr. 29, 2005.

\* cited by examiner

*Primary Examiner* — Xuan Thai
*Assistant Examiner* — Evan Page
(74) *Attorney, Agent, or Firm* — Jason P. Mueller; Adams and Reese LLP (57) ABSTRACT

The invention is a medical simulation system having a system computer, at least one output display device, at least one input device an instructor terminal and a mannequin. The invention includes scenarios that execute on the computer system and output simulated physiological values to the display devices. The invention includes a means to communicate between multiple executing scenarios to allow integration of the executing scenarios. The invention includes a control panel interface displayable on the instructor terminal to provide a user friendly input means for the instructor.

26 Claims, 8 Drawing Sheets

MEDICAL SIMULATION COMPUTER SYSTEM

FIELD OF INVENTION

This invention relates to medical training methods using a computer operated simulation environment, and in particular, to methods of allowing complex medical conditions to be simulated.

BACKGROUND OF THE INVENTION

Training physicians in particular tasks generally involves "student" physicians working under the close supervision of a treating physician (an "instructor") as that treating physician deals with and treats patients experiencing particular medical conditions. Drawbacks to this training system are numerous. For instance, students are given limited access to medical conditions, as students can only be exposed to medical conditions that actual patients experience. Further, students generally are not given the latitude to make improper treatment decisions due to the catastrophic conditions that may result.

To provide controlled but realistic training, simulated patients have been developed that can emulate the physiological conditions of a patient experiencing commonly occurring trauma or other medical conditions. For instance, Medical Education Technologies, Inc ("METI") has developed a computer simulation system consisting of a computer controlled mannequin (a simulated human patient), a physiological monitor, and software used in conjunction with the system. The mannequin and monitor "display" the physiological conditions of a "patient" experiencing a pre-scripted medical condition. The "scripted" medical condition is a software file referred to as a scenario. Each scenario is executed on the computer and specifies: (1) the baseline or starting state of the "patient" experiencing the medical condition; (2) possible stages, or states, of the evolving medical condition. Each "state" within a scenario is composed of (a) physiological events that may occur within the particular state, and (b) possible transitions from one state to another within the scripted medical condition. As the script plays out, the mannequin and monitor will display the physiological conditions and changes specified by the executing scenario.

Transitions can be under instructor control, student control, or system control based upon detection of a change. For instance, the instructor, from a control station, may manually force the script to change states. Alternatively, the script may detect a student response (an "intervention"), for instance, the administration of medication, and automatically change states based upon the intervening action (the medication given/dosage levels, etc.). In this fashion, the METI system allows the evolution of a particular medical condition to be dependent upon decisions made by the student or the instructor. Hence, the same scenario can result in different outcomes based upon the student's responses and interventions.

The METI system accomplishes this by: (1) monitoring variables, such as an intervention detection, and (2) using the variables as inputs to the executing scripted file. The scripted file uses the transition variable's value to make decisions on how the medical condition evolves. Variable values can be automatically determined or set by student actions or the computer system or may be manually input by the instructor from the control station. An example of an automatically determined variable value in the METI system is "lapse of time;" another automatically detected value could be the detection of the administration of electrical shock, detected by sensors placed on the mannequin. Additionally, the instructor can manually modify the ongoing scenario through instructions input through a control station, such as by setting a transition variable value, or forcing the scenario to move to another scripted state (such as through a inputted "go to" type of command).

While flexible in allowing for evolution a single particular physiological event, simulated patient systems, including the METI system, remain cumbersome when used to portray complex medical cases. Many medical conditions or cases reflect more than one physiological event. For instance, an automobile accident trauma patient's overall condition may be the result of internal bleeding, lung collapse, and head injuries. The overall physiological state of the patient may be the result of interactions of the separate physiological events. Further, proper treatment of the overall complex state may progress or sequence differently than would treatment of each physiological event considered alone. To attempt to deal with complex events, some simulations systems, such as the METI system, allows the user to run several scenarios simultaneously. However, each individual scenario runs independently of all other scenarios, and hence, the interaction between scenarios is lacking. What is needed is a method of providing communication between scenarios so that the multiple scenarios can be interwoven into a complete complex case and to provide overall control of the complete case of multiple scenarios by the instructor.

SUMMARY OF THE INVENTION

The invention is a medical simulation system having a system computer, at least one output display device, at least one input device, and as instructor terminal. The system can include a mannequin. The invention includes scenarios that execute on the computer system and output simulated physiological values to the display devices. The invention includes a means to communicate between multiple executing scenarios to allow integration of the executing scenarios. The invention may also include a control panel interface displayable on the instructor terminal to provide a user friendly input means for the instructor, and may include a control scenario.

OBJECTS OF THE INVENTION

It is an object of the invention to allow a medical simulator to run multiple scenarios and integrate the action of the multiple scenarios.

It is another object of the invention to allow multiple scenarios to communicate status or other information between the scenarios without affecting the displayed characteristics of the evolving medical case.

It is another object of the invention to provide a control screen on an instructor terminal to allow the instructor to input parameters or conditions in a user friendly manner.

It is an object of the invention to integrate multiple scenarios to provide for complex medical cases.

It is another object of the invention to provide a control scenario to accept instructor inputs and determine the progression of the evolving medical case based upon the input received.

DETAILED DESCRIPTION OF THE INVENTION (A) Prior Art Systems

Figure 1:
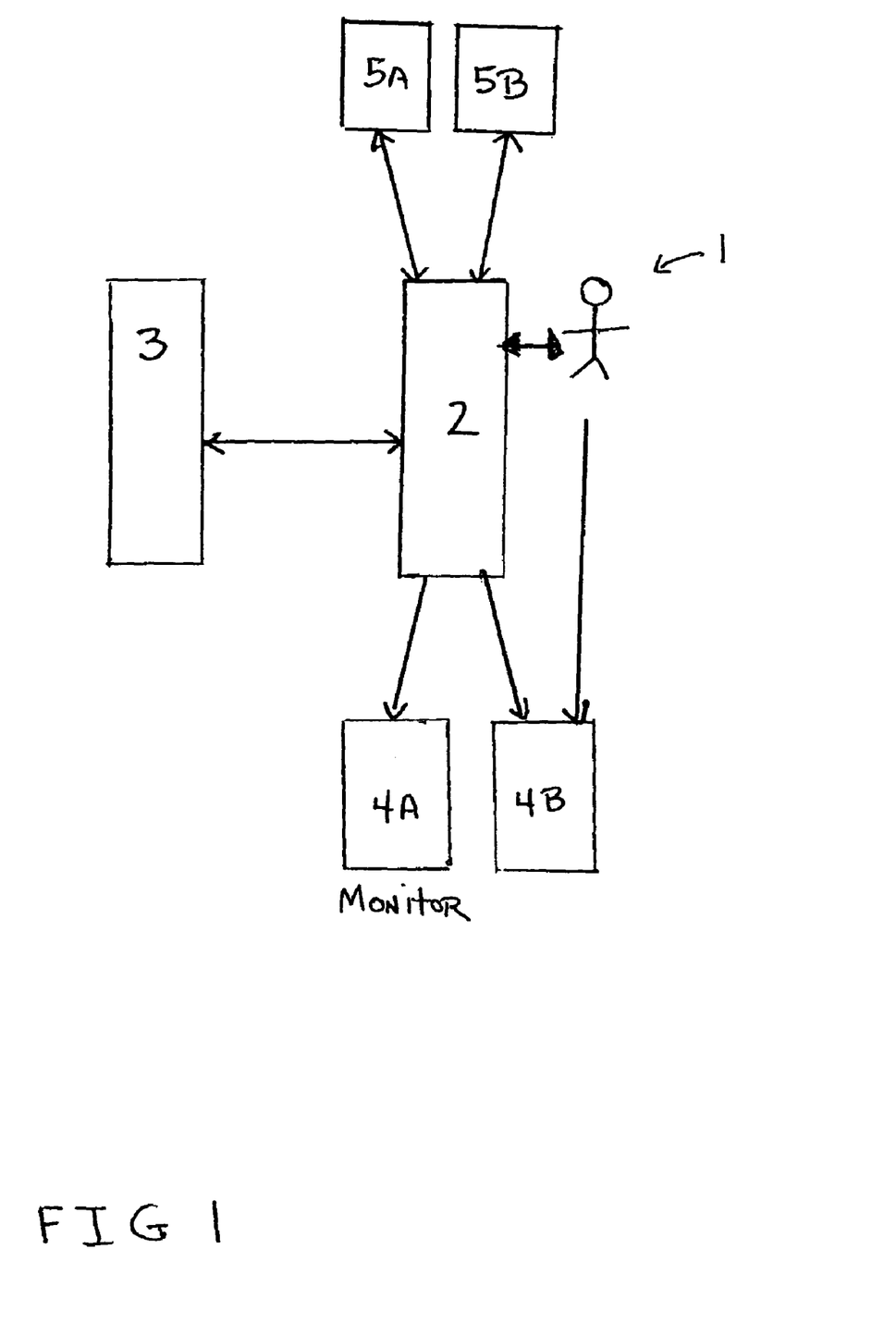
FIG. 1 depicts a schematic the system hardware and inter-relationships.

Shown in FIG. 1 is the general overlay of the system. The system will be generally described as the METI system, although other patient simulators are similar. The patient simulator includes a mannequin 1, a system computer 2, a control terminal 3, a monitor 4A and various other output devices, 4B or input devices, 5A, 5B, etc. All the devices are connected to the system computer, and may be connected directly or indirectly through a network (intra or internet) or other device.

The mannequin is mechanized to display or reflect simulated physiological conditions (such as blinking eyes, heartbeat, wheezing, etc) under programmed instruction. The mannequin may also have an embedded computer system that communicates with the system computer and other devices, and as such, can be considered both an input and output device. The monitor and other output devices can also display programmed physiological characteristics, such as blood pressure, heart rate, etc., under programmed instruction, generally, as specified in an executing script. Input devices are means to communicate student actions to the computer system, and can include active monitors that detect student interventions, such as electric shocks detectors positioned on the mannequin, or a drug injection system that signals the system computer of a drug injection (a bar scanner used to identify the drug, and a fluid monitor to monitor the volume of drug injected). Other active monitoring devices can be used, as well as inactive monitoring devices. An inactive monitoring device can signal the computer system of the occurrence of an event but does not directly monitor or detect an event. Generally, this type of input device will be a terminal where the action undertaken is specified by the student or instructor. For instance, the instructor, from the control terminal, may communicate to the system that the student has undertaken a particular action, such as insertion of a bronchial tube.

The mannequin and a subset of the input/output devices are the "stage props" upon which a particular medical training session is played out. A training session, from the viewpoint of the students, consists of the evolving physiological characteristics of a medical condition, as reflected by the mannequin and devices which "monitor" or reflect the simulated physiological conditions. The students respond to the current physiological conditions, and the system detects the response (either through direct monitoring or indirect monitoring). The detected actions are used by the system computer to determine if the simulated physiological characteristics of the "patient" should be modified, and to display the modified characteristics. For instance, consider a "patient" who is displaying symptoms of cardiac fibrillation. One possible response to this state could be injection of a drug; another response to this state could be the application of electric shock. In either event, the system would detect the intervention (application and amperage of the administered shock; or determine drug and volume administered), and in response to the "input" or student response, the system computer may alter the displayed characteristics of the "patient."

Scripts or programming of a medical condition can be ported into the system, or built using an onboard program in the system computer or control terminal, such as scenario editor. Each script is considered a "scenario" and is comprised of one or more states, and for each state, one or more possible means to transition between states of the scenario. Within a particular state, the displayed physiological parameters can be modified to reflect the circumstances dictated by the particular state. Each state can be considered a "snapshot" of a particular evolving condition. The "snapshot" is displayed on the mannequin and the monitor in accordance with the coded instructions for that particular state. From a particular state, the scenario will evolve or transition to another "snapshot" or state. A transition can be as simple as the passing of time, or the occurrence of a detected input, such as student intervention.

Each scenario is usually initiated by specifying a baseline state—the patient's initial profile. The patient profile consists of parameters such as age, sex, body weight, and resting or initial physiological conditions, such as heart rate, mean arterial pressure, cardiac output, pulse oximeter saturation, ischemic index, lung volume, blood pH, blood temperature, body temperature, respiratory rate, and various other measurable or calculable physiological conditions. The patient profile can be selected by individually setting parameters, or selecting a preprogrammed patient profile.

Figure 2:
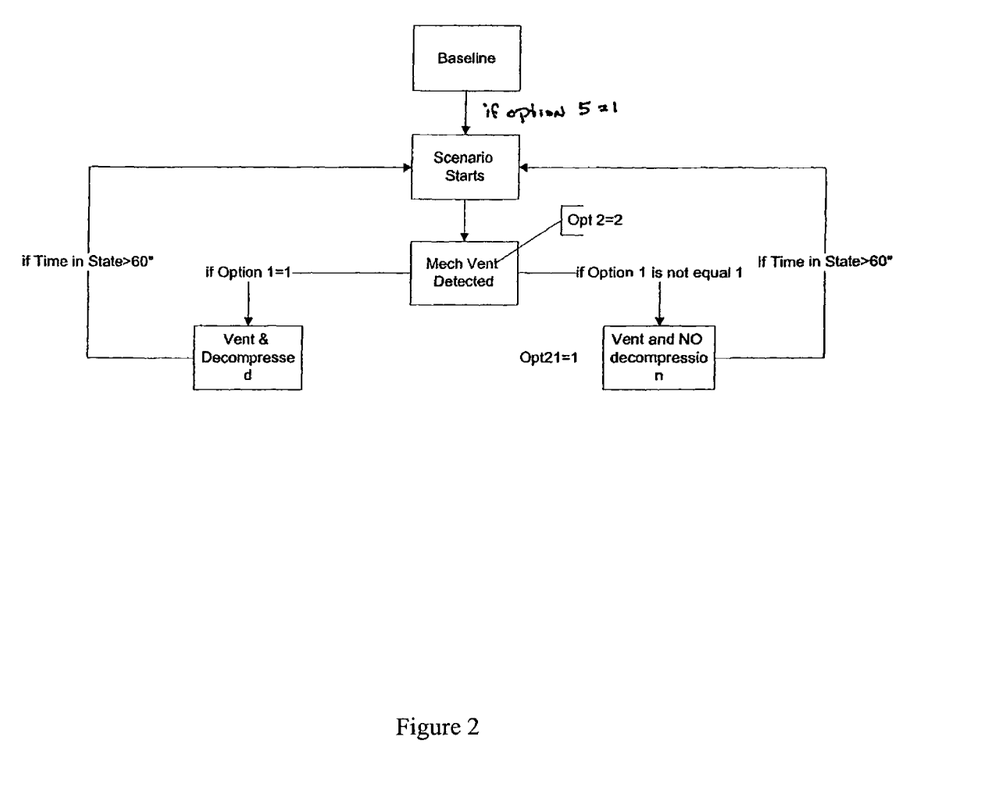
FIG. 2 depicts a flowchart for a particular scenario.

Consider the scenario shown in FIG. 2. As shown, the scenario starts is state 1. In state 1, certain physiological parameters are set or modified from previous values. State 1 has several possible transitions to other states, including: (1) if time in state is greater than 120 seconds, move to state 5; and (2) if drug b is administered, move to state 3. The scenario remains in state 1 until a transition occurs. Within state 1, certain variables or parameters can be modified based upon the occurrence of other events, for instance, if time within state 1 is greater than 30 seconds and option 1 equals 3, double the heart rate and raise blood pressure by a multiplier of 1.25 and set option 1 value to 0.

The system displays or outputs the parameter variable values specified by the executing scenarios. If two scenarios are running on the system simultaneously, and each is attempting to modify the same variable, for instance, heart rate, difficulties and/or conflicts can arise. Such a conflict creates problems for the system (indeed, severe conflicts can result in system crash), and further, such conflicts can create problems for the students attempting to interpret the displayed physiological conditions in order to arrive at the proper response to the displayed conditions.

(b) The System Improvements

To enable a multi-faceted medical case to be implemented when running multiple scenarios simultaneously, it is necessary that multiple executing scenarios establish communications between them to integrate the physiological parameters to be displayed. Lacking access to source code in the METI, it was not possible to modify the existing code to accomplish the needed communications. The METI system, however, does allow any executing scenario to access the current value of certain physiological parameters. Additionally, the METI system provides certain variables (referred to as "option variables") which are variables that have no prior defined physiological meaning. Both option variables and physiological variables can be queried by all executing scenarios, that is, these variables are global or "visible" to all scenarios executing on the system, and are referred to as "System Variable." By judicious use of the certain System Variables, the desired co-ordination and integration between scenarios can be achieved, as exemplified in FIG. 2.

FIG. 2 depicts a scenario for Mechanical Ventilation Analysis. This particular scenario continuously cycles looking for a particular desired state or status, decompressed and ventilated. The scenario starts in the baseline state and remains in the baseline state, until a "start signal" is detected. For this scenario, the value of "Option 5" is used to detect startup. This scenario does not set the value of "Option 5," only checks this variable's value for decision making purposes. The setting of "Option 5" to a suitable value is performed elsewhere, either by the instructor or another executing scenario. Once the suitable value of option 5 is detected, the scenario transitions to the next state, which is monitoring for the occurrence of mechanical ventilation. Detection of ventilation may be a directly detected input or indirectly detected input, depending on the sensor configuration of the mannequin. Once mechanical ventilation is detected, the scenario sets the value of "Option 2" to "2" for use by other executing scenarios. The executing scenario then checks to see if the patient has been decompressed and this is accomplished by querying the value of "option 1." Generally, the "decompression state" is an indirect variable (the decompression state of the mannequin will be set by the instructor from the control terminal). The instructor, through the control panel will set the value of Option 1 as needed to reflect the true state of the patient. If no decompression is indicated, Option 2 is set equal to 1 for use by other scenarios. If decompression is indicated, (Option 1 equals 1), the value of Option 2 is not modified. In either case, the scenario "clocks" the time in the state, and if greater than 60 seconds, returns to monitoring for the decompression state, where the process begins anew. As described, this scenario communicates with other scenarios through the use of System Variables, here, the variables "Option 5", "Option 2" and "Option 1."

Figure 3:
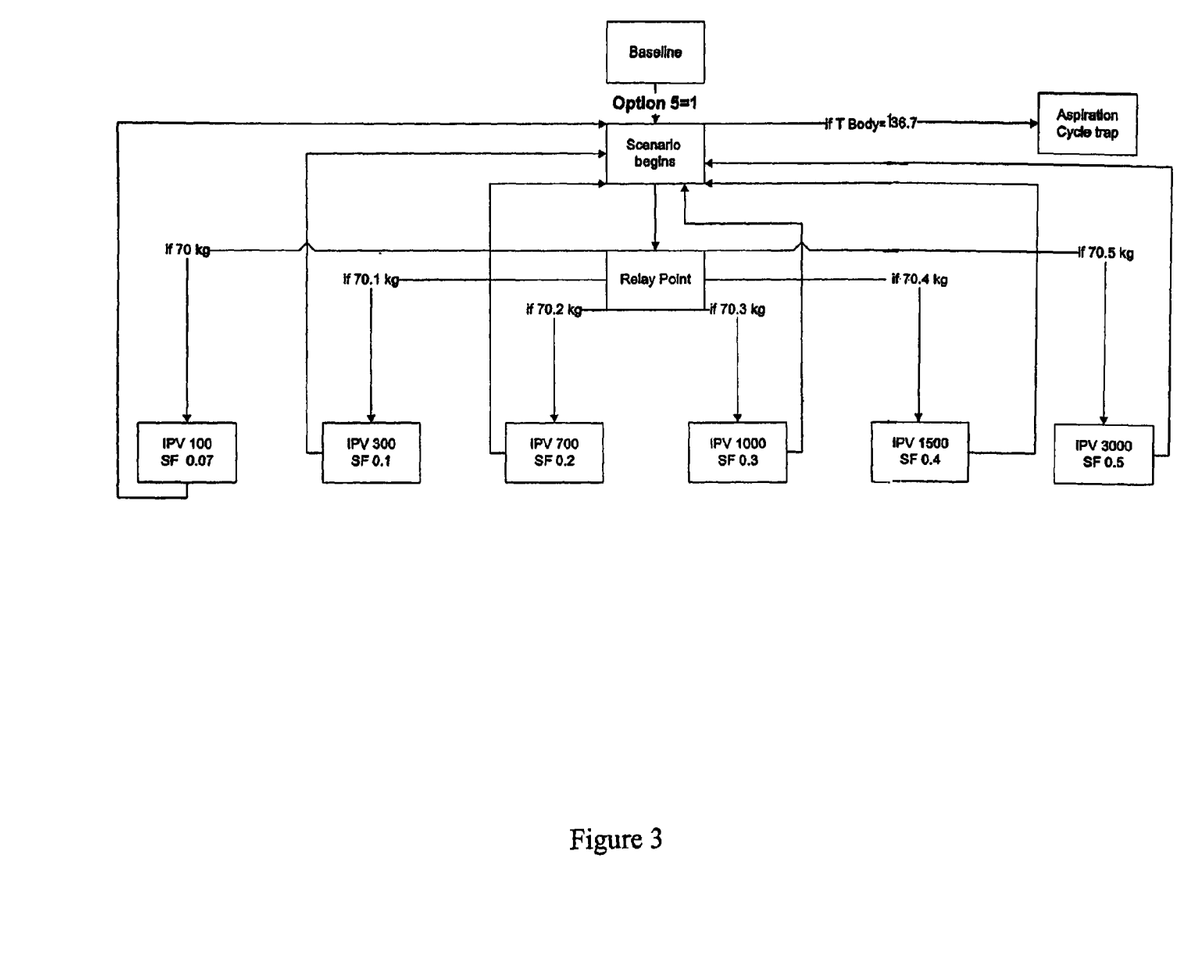
FIG. 3 depicts a flowchart for another scenario.

An example of using other variables to integrate scenarios is shown in FIG. 3. The scenario shown here, the Shunt Fraction Adjustment scenario, is implemented to track the progress of another scenario, the pneumothorax scenario. This scenario starts in a baseline state, and remains in the baseline state until "Option 5" value is detected as being equal to "1". After initiation, the scenario uses the physiological variable "patient weight" to set the value of certain parameters (SF or shunt fraction, and IPV or intra pulmonary volume). Additionally, the scenario checks the body temperature value, and will go to the "Aspiration Cycle Trap" state (details not shown) when the temperature is equal to 36.7 C.

As can be seen from FIGS. 2 and 3, these two routines are synchronized by the value of Option 5. Option 5 may be set by the instructor upon start up, or this value may be set by another executing scenario.

The scenario depicted in FIG. 3 uses the physiological variables of "body weight" and "body temperature" to make decisions. The "body weight" and "body temperature" values will be established or modified by other scenarios as appropriate to communicate status information to the scenario in FIG. 3. Option values could have been used instead of these physiological variables. However, the METI system provides a limited number of option variables, and if these are exhausted, other physiological variables must be used to establish communication across scenarios. It is not desired to modify parameters that are in use by the various scenarios to reflect changes in physiological state of the "patient" due to the evolving medical case, such as heart rate, blood pressure etc. Instead, physiological variables that would not be expected to change (height, weight, etc) or physiological variables that are not relevant to the particular medical condition being simulated (for instance, body temperature in a head trauma case) can be used as a means to communicate status or other information between scenarios. All such values are referred to as "Stable Physiological Variables," as changes in these variables will not materially affect the evolving medical case as displayed on the various output devices. Stable Physiological Variables and System Variables are referred to as "Linking Variables," and can be used to communicate status or state information between scenarios.

Communication across scenarios is established by setting values of certain variables, the Linking Variables. Generally, the parameters used to channel communications are "passive" parameters, that is, parameters that represent conditions that are not anticipated to have a material impact on the progression of a particular medical condition. In certain instances, however, active parameters (non-Linking Variables) may be used, for instance, heart rate. As an example, heart rate can be monitored, and if the rate falls below a particular value, a scenario for application of electro-shock could be initiated.

The technique described above allows for multiple scenarios to communicate without unnecessarily disturbing the displayed physiological state, that is, without disturbing the evolving medical case. The communication allows one scenario to transmit status or information to another scenario for decision making purposes, synchronization purposes or other purposes. This technique allows the instructor to build a complex medical case from a series of more simple conditions, each condition reflected in a scenarios. Indeed, the complex case can be easily modified or constructed by assembling a series of pre-built or pre-scripted scenarios.

(c) The Control Panel Interface

Figure 6:
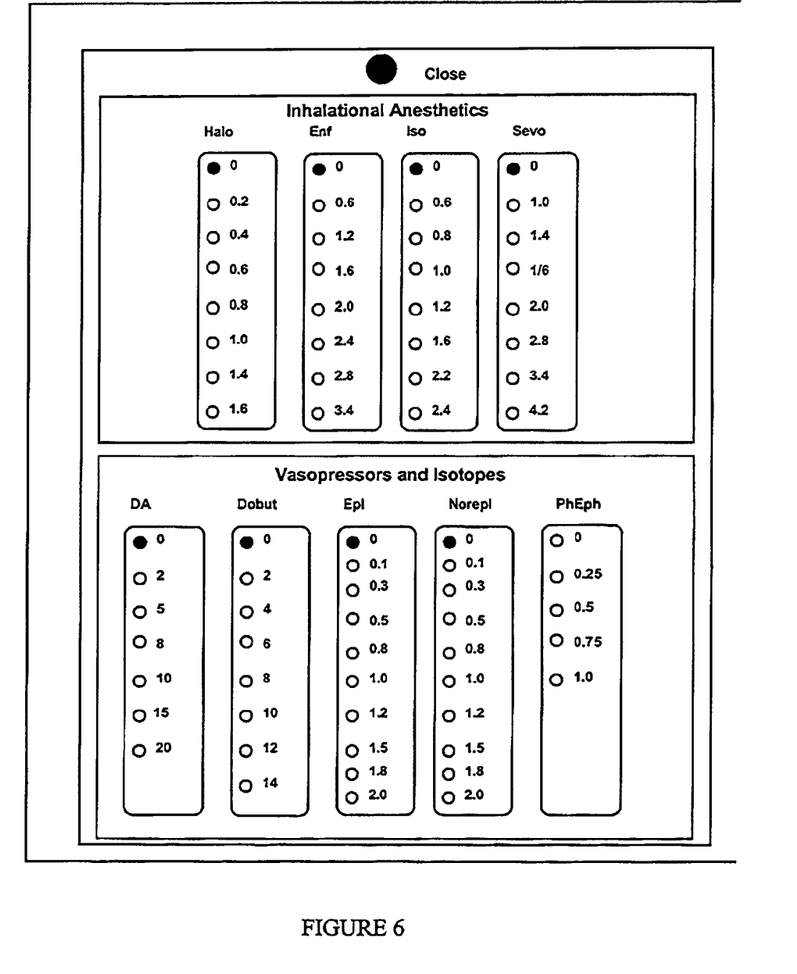
FIG. 6 depicts a second screen shot from the embodiment of the control interface program depicted in FIG. 5.
Figure 7:
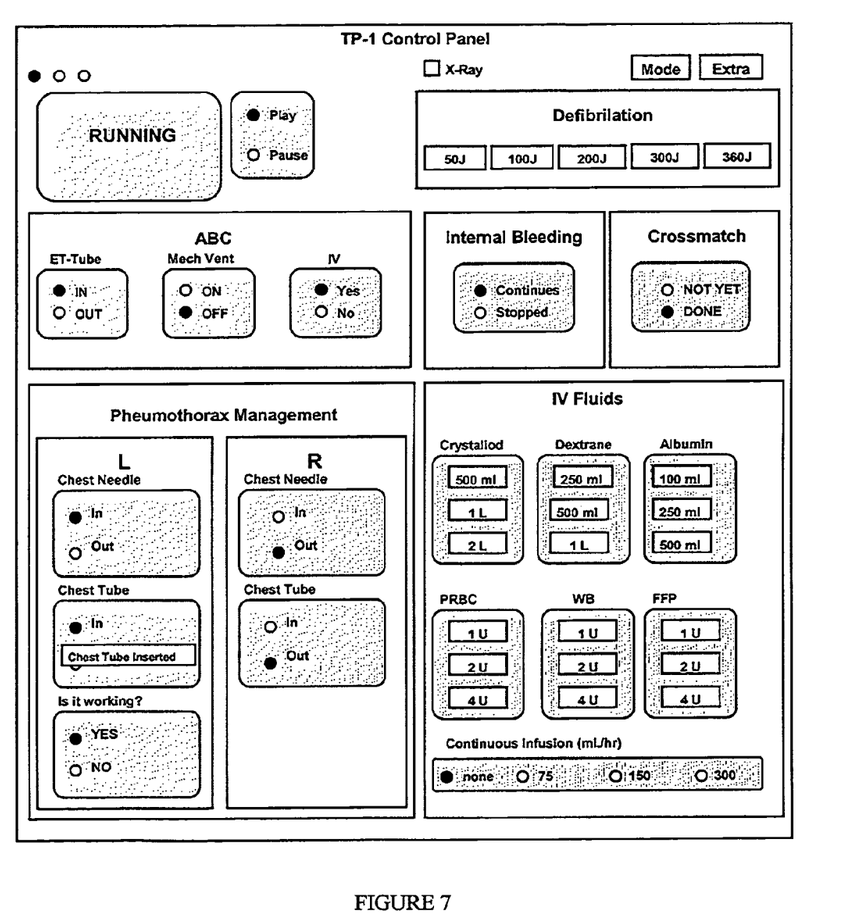
FIG. 7 depicts a screen shot from one embodiment of the control interface program.

The complex case, however, presents co-ordination problems for indirect variables, that is, variables that must be set by the instructor (or system operator). To assist the instructor, a "control panel" can be coded to function as the interface between the operator and the executing scenarios. The control panel is displayed on the instructor's terminal concurrently with the execution of multiple scenarios. The control panel interface is software that, when executed, displays a "user friendly" input screen(s) on the instructor terminal. The control panel acts as an input device, and upon accepting input from an operator ("clickable" buttons in one embodiment), the control panel can operate to directly set variable values for use by the executing multiple scenarios, or communicate the input to a control scenario or other scenarios for use of the input by these scenarios for decision making, sequencing, integration and other purposes. For use in the METI system, the applicants' have scripted control panel software in Real-Basic and AppleScript files for execution on the system computer or instructor terminal. An example of such control panels built for use in the METI system is shown in FIGS. 5, 6 and 7, which depicts screen shots of the control panel seen by the operator, generally, the instructor.

Figure 5:
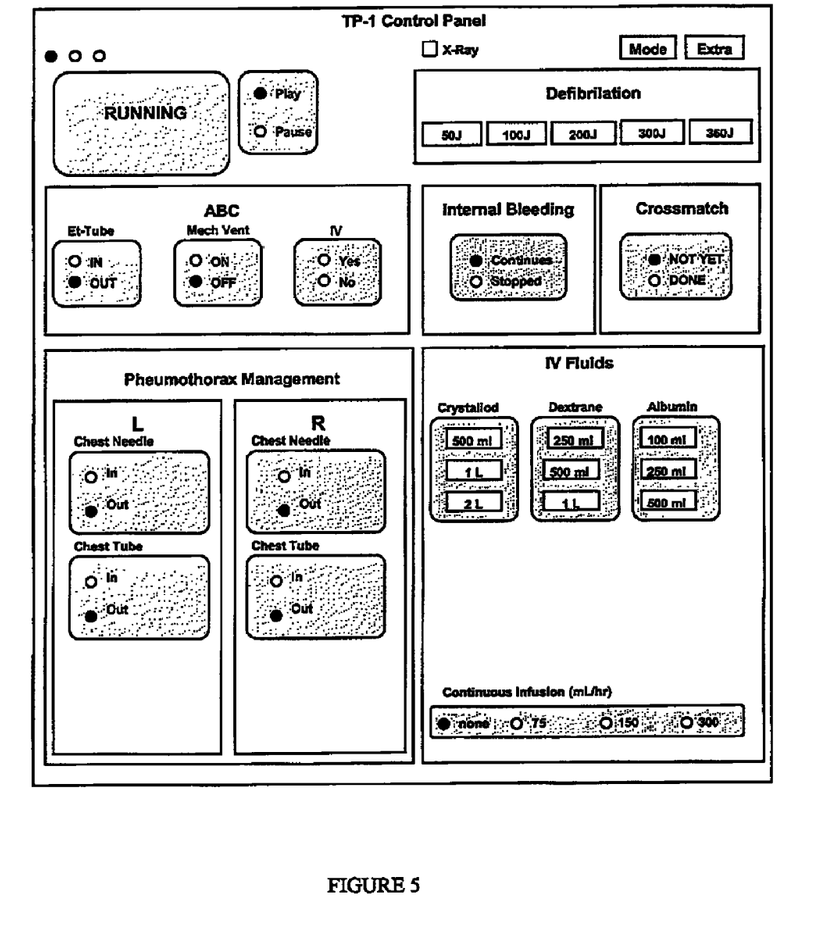
FIG. 5 depicts a screen shot from one embodiment of the control interface program.

The screen shot shown in the control panel of FIG. 5 shows a series of clickable buttons that the instructor can click on/off (activate/deactivate) to perform functions. What information is displayed on the instructor's terminal or available for display (through pull down screens or drawers), can be dependent on the current state of the case of the "patient." As shown in FIG. 5, the control screen is partitioned into sections: an ABC section; a pneumothorax management section; a defibrillation section; internal bleeding section; blood cross match section; and IV fluids section. Certain of the screen sections allow the instructor set states on/off. For instance, the ABC section allows the operator to specify that an ET tube has been inserted. Other sections allow the operator to specify a value for a particular intervention action. For instance, the defibrillation section allows the instructor to click "on" the joules value of an electric shock administered by the students.

In this fashion, the instructor can specify variable values or states that are not directly detected by the computer system.

The control panel has options to tab to addition screens or windows. In the control screen of FIG. 5, the "Extra" and "Mode" buttons (the names are nondescript) allow the user to access pull down screens or menus containing additional information for interventions. For instance, in the control panel of FIG. 5, clicking the "extra" button displays a side menu (shown in FIG. 6) of available inhalation anesthetics and vasopressors/inotropes that can be administered with clickable buttons reflection the values available for administration. Instead of having individual buttons for particular interventions, the control screen can be equipped with a single button (such as the "mode" button) which will display a menu of available screens or windows that can be displayed.

As indicated above, the information displayed on the control screen may be dependent on the current state of progression of the medical case. Shown in FIG. 7 is an example of this situation. FIG. 7 shows the information displayed when the "Crossmatch done" button is operated: additional information is displayed in the "IV Fluids" section of the screen, this being the type of blood products that can be administered and the quantity available for administration (the number of units).

The control screen can be custom built for the particular medical case, or standardized, using pull up screens to handle circumstances of particular conditions. The control panel as described serves a variety of functions. First, the control panel allows ease of input of variable values to the system. Prior art systems required the operator to access the scenario and directly input the change of state. Hence, by using the control panel, the operator does not have to determine which scenario requires change of state. The change is either provided to a control scenario for handling/distribution or is "posted" in the computer system at a location that is accessible by or visible to all executing scenarios.

Additionally, the control panel allows the operator to indicate an action occurring without the need to understand the internal coding of the scenarios. For instance, suppose that the administration of a particular drug is to be detected by a particular scenario through a change in "Option 3." To affect this input, the instructor must know: (1) which scenario to access: (2) what variable to modify; and (3) the particular value that that variable is to assume. Unless the instructor/operator is intimately familiar with the internal coding of the case and multiple scenarios, this will not be possible. However, the control panel thus allows the instructor to specify an intervention without the need to know how that intervention is handled internally and by what scenario. This allows the "instructor" to be an individual without particularized knowledge, and indeed, the "instructor" would not have to be a physician, but could be a non-participating student.

The control panel also can be configured to indicate the start of a medical condition, as opposed to the occurrence of a student intervention. For instance, the instructor may want a particular event to occur during a case, such as the onset of internal bleeding, at a chosen time. As shown in FIG. 5, a button is present that indicates "Internal Bleeding" and the instructor can actuate this button to initiate the desired medical condition. There may be a particular button on the home screen or a pull down screen from which the instructor can chose the start of a particular medical condition. In this instance, the choice of "internal bleeding continues" can set an option value which triggers the start of an "internal bleeding scenario."

As described, the control panel provides for flexibility of in directing the evolving complex case, and allows for the case to proceed in "real" time, as the instructor simply indicates the action taken and does not have to search through the various executing scenarios to select the needed input. Hence, use of a control panel eliminates operator induced delay that can affect the natural progression of the medical condition in response to a student intervention or medical condition.

(d) The Control Scenario

In complex cases, it may be necessary to have a single "control scenario" to interact with the control "panel." An example of this is shown in FIG. 8 that shows a scenario having a baseline state, and a series of states all connected in parallel to the baseline state. Within each state, events occur (such as setting or modifying variable values) and, in this particular embodiment, each series of states transition back to the baseline state. This control scenario operates in the context of a particular medical condition, as follow.

Each scenario in the medical condition is started (including the control scenario) from the instructor terminal. The control panel code is then started, displaying the initial control panel screen on the instructor's terminal. The instructor clicks the "start" button form the control panel screen. The control scenario detects actuation of the "start" button in the baseline state, and transitions to the Synchrostart state. Within the Synchrostart state, Option 5 is set equal to "1." The "Synchrostart" state then transitions back to the baseline state. The setting of Option 5 is detected as a "start" indicator for other running scenarios (see FIG. 1). Those scenarios that depend on Option 5 to start, are "started" that is, these scenarios transition from the scenario baseline states to the next state in the scenario.

Figure 4A:
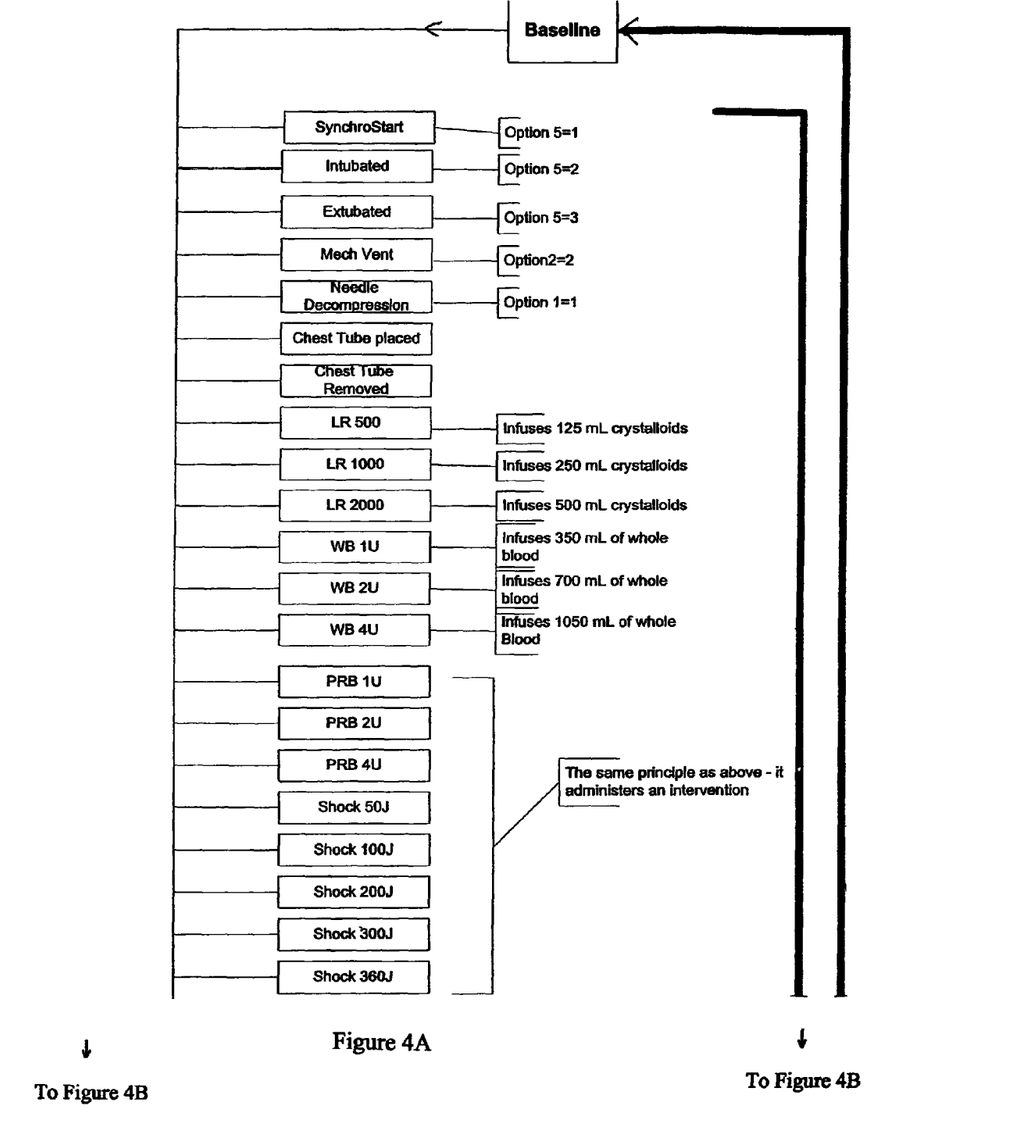
FIG. 4 depicts a flowchart for an example control scenario.
Figure 4B:
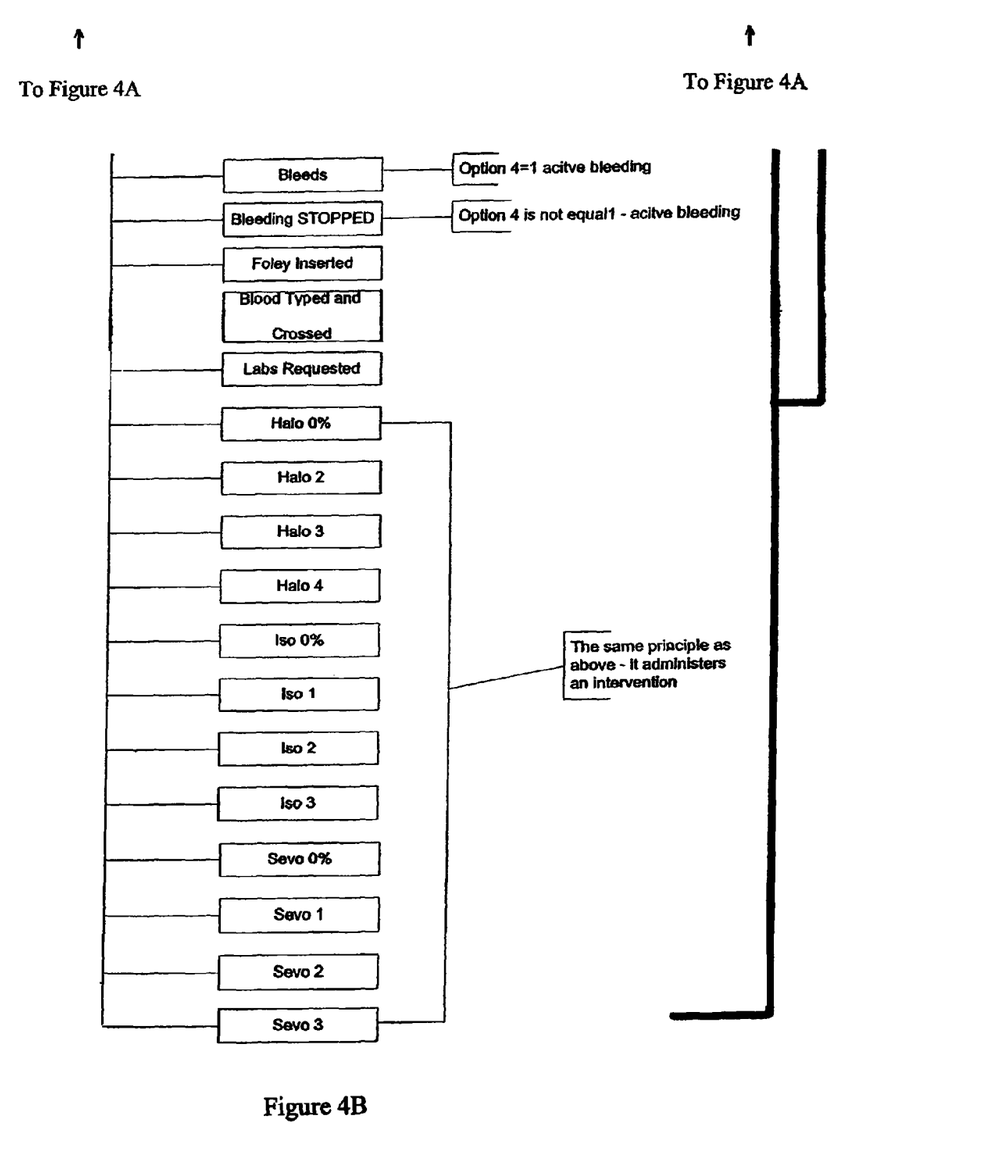

The control panel scenario then lies dormant in the baseline state until another indirect intervention is detected through actuation of an option or button on the instructor control panel. For instance, if the "patient" is mechanically ventilated by the students, the instructor would click on the "Mech Vent on" button in the ABC section of the control panel screen, shown in FIG. 4. The control panel scenario baseline state detects the actuation of this button, and transitions to the Mech Vent state, where Option 2 is set to the value "2." The Mech Vent state then transitions back to the baseline state. Alternatively, suppose four units of whole blood are provided (this can be a virtual event, i.e., the students indicate blood is need and number of units to be provided) to the mannequin. The instructor would click on the appropriate button in the control panel. The control panel baseline state detects the actuation of the button and transitions to the suitable state (WB4U). Within this state, physiological parameters may be set (for instance blood pressure modified) or options may be set. At completion, the WB4U scenario transitions back to the baseline. Again, the variable values set in the control scenario states can be used by other executing scenarios as "input" or decision making parameters.

As can be seen, the Control Scenario is designed to account for possible indirect interventions, and the states in the control scenario will generally correspond with the buttons on the control panel. It is possible to combine several buttons into one state, and let the state make the determination of the proper action. For instance, the baseline state could be configured to detect the administration of a drug, and transition to a "drug administered" state and pass the drug administered as an input variable for the "drug administered" state for further processing and decision making. However, it is believed more efficient (that is, simpler coding) if each intervention is provided with its own state.

The use of the control panel allows the instructor to interact with the evolving medical case without having to intervene directly in each appropriate executing scenario. Instead, the instructor's "intervention" is detected by the Control Scenario, and the Control Scenario then sets or modified the appropriate variable or parameter, including Linking Variables (if required), and such modified value can be detected by the an executing scenario for action or decision making purposes.

As can be seen, a "scenario" can represent an evolving medical condition or particular medical state or procedure (such as the Mechanical Ventilation Analysis) or can represent background actions not reflected in the medical state or condition (for instance, the Control Scenario, which monitors to detect actions and upon detection, sets variable or state values for uses within the evolving case). The term "scenario" encompasses all such uses, that is, software executable files.

Other uses and embodiments of the invention will occur to those skilled in the art, and are intended to be included within the scope and spirit of the following claims.

We claim:

1. A method, comprising:
   (a) providing a medical simulation system comprising a system computer at least one output display device, at least one input device; said system computer system communicating with said input and output devices, said system having stored thereon a series of simultaneously executable scenarios, certain of said series of scenarios adapted to set or modify physiological parameters of a simulated patient specified for display on certain of said output display devices and wherein each scenario is a unique evolving medical condition comprising:
      (i) a starting state of the simulated patient experiencing the medical condition; and
      (ii) at least one state of the evolving medical condition, wherein each state comprises:
         (1) at least one physiological variable; and
         (2) criteria for transitioning the evolving medical condition from the current state into another state;
   (b) simultaneously executing the series of simultaneously executable scenarios;
   (c) providing a set of executable instructions configured to set the value of at least one physiological variable in a first scenario of said series of executing scenarios to a corresponding physiological variable in a second scenario of said series of executing scenarios; and
   (d) executing the set of executable instructions,
   wherein an evolving medical condition is at least one of an injury, a disease, an illness, and a malady.

2. The method of claim 1 wherein the at least one physiological variable is a Stable Physiological Variable.

3. The method of claim 1 where the at least one physiological variable is a System Variable.

4. The method of claim 1 where setting the value of at least one physiological variable in a first scenario of said series of executing scenarios to a corresponding physiological variable in a second scenario of said series of executing scenarios results in the second scenario exiting a baseline state.

5. The method of claim 1 wherein setting the value of at least one physiological variable in a first scenario of said series of executing scenarios to a corresponding physiological variable in a second scenario of said series of executing scenarios results in the second scenario modifying a non-Stable Physiological Variable value.

6. The method of claim 1 wherein said set of executable instructions includes the step of detecting a user intervention.

7. A medical system for simulating a multi-faceted medical case, comprising: a system computer, at least one output display device, at least one input device; a set of instructions; and an instructor terminal, said set of instructions configured to set the value of at least one physiological variable in a first scenario of said series of executing scenarios to a corresponding physiological variable in a second scenario of said series of executing scenarios, said system computer communicating with said instructor terminal and said input device and said output display device, said system having stored thereon a series of simultaneously executable scenarios, said system further having a control panel interface displayable on said instructor terminal, said control panel interface displaying simultaneously a series of selectable values, said control panel interface adapted to accept inputs from an operator selecting one of said series of selectable values and communicate said selected value to said scenarios and wherein each scenario is a unique evolving medical condition comprising:
   (i) a starting state of a simulated patient experiencing the medical condition; and
   (ii) at least one state of the evolving medical condition, wherein each state comprises:
      (1) at least one physiological variable; and
      (2) criteria for transitioning the evolving medical condition from the current state into another state; and
   wherein an evolving medical condition is at least one of an injury, a disease, an illness, and a malady.

8. The medical system of claim 7 wherein said medical system further included a mannequin as an output device.

9. The medical system of claim 7 wherein said series of scenarios includes a control scenario, said control scenario adapted to receive certain of said selected values from said control panel interface and to set or modify a Linking Variable in response to said received selected value.

10. The medical system of claim 9 wherein said control scenario includes a series of states, one of said series being a baseline state, said baseline state adapted to receive said selected value and transition said control scenario to another of said series of scenarios based upon the received selected value.

11. A method of communicating between a plurality of scenarios in a simulated multi-faceted medical case, comprising:
   (a) executing a plurality of scenarios on a medical simulation system;
   (b) executing a set of instructions on the medical simulation system, said set of instructions configured to:
      (1) identify a first physiological variable to be communicated between the plurality of scenarios;
      (2) identify as a Linking Variable a second physiological variable, wherein the second physiological variable is globally accessible to the plurality of scenarios and not relevant to the simulated medical case; and
      (3) assign a value of the physiological variable to be communicated between the plurality of scenarios to the Linking Variable,
   wherein each scenario is a unique evolving medical condition comprising:
      (i) a starting state of a simulated patient experiencing the medical condition; and
      (ii) at least one state of the evolving medical condition, wherein each state comprises:
         (1) at least one physiological variable; and
         (2) criteria for transitioning the evolving medical condition from the current state into another state,
   wherein the plurality of scenarios are executable simultaneously, and
   wherein an evolving medical condition is one of an injury, a disease, an illness, or a malady.

12. The method of claim 11, wherein the Linking Variable is a height or a weight.

13. The method of claim 11, wherein the Linking Variable is a Stable Physiological Variable.

14. The method of claim 11, wherein the Linking Variable is a System Variable.

15. The method of claim 11, wherein each of the plurality of scenarios represents a distinct medical condition.

16. The method of claim 11, wherein each of the plurality of scenarios and the set of instructions is implemented as a software executable file.

17. The method of claim 11, wherein the plurality of scenarios and the set of instructions are conducted on a system, comprising: a system computer, at least one output display device, at least one input device; and an instructor terminal, said system computer system communicating with said instructor terminal and said input device and said output display device, said system having stored thereon the plurality of scenarios, said system further having a control panel interface displayable on said instructor terminal, said control panel interface displaying simultaneously a series of selectable values, said control panel interface adapted to accept inputs from an operator selecting one of said series of selectable values and communicate said selected value to said scenarios.

18. The method of claim 17, wherein the at least one output device is a mannequin.

19. A system for simulating a complex medical condition, comprising:
(a) a patient simulator, comprising:
(1) an output device, wherein the output devise is configured to display a plurality of physiological parameters of a simulated patient;
(2) at least one input device;
(3) a computer;
(4) a first set of instructions defining a first scenario, wherein said first scenario is a first evolving medical condition, comprising:
(i) a starting state of the simulated patient experience the first medical condition; and
(ii) at least one other state of the first evolving medical condition, wherein each state comprises:
1) at least one physiological variable;
2) criteria for transitioning the first evolving medical condition from the current state into another state; and
3) criteria for changing at a physiological parameter; and
(5) a second set of instructions defining a second scenario, wherein said second scenario is a second evolving medical condition, comprising:
(i) a starting state of the simulated patient experience the second medical condition; and
(ii) at least one other state of the second evolving medical condition, wherein each state comprises:
4) at least one physiological event wherein at least one of the physiological parameters is changed; and
5) criteria for transitioning the second evolving medical condition from the current state into another state; and
(b) a third set of instructions, wherein the third set of instructions is configured to establish communication between the first and second scenarios such that a physiological event in one of the first or second scenario is recorded as a physiological event in the other scenario,
wherein each of the first, second, and third sets of instructions are stored in and simultaneously executed by the computer, the computer configured to manipulated each of the plurality of physiological parameters,
wherein each of the first and second sets of instructions is configured to monitor the state of the at least one input device, and
wherein an evolving medical condition is at least one of an injury, a disease, an illness, and a malady.

20. The system of claim 19, wherein the output device is a mannequin, wherein said mannequin is configured to display each of the plurality of physiological parameters by manipulation of a physical characteristic of the mannequin.

21. The system of claim 20, wherein the at least one input device is a sensor on the mannequin.

22. the system of claim 19, further comprising a control panel including at least one input device.

23. The system of claim 22, wherein the control panel further comprises a plurality of input devices.

24. The system of claim 23, wherein the control panel further comprises a computer interface configured to manipulate input devices, start and stop each of the first and second scenarios, and manipulate physiological events.

25. The system of claim 19, wherein the at least one input device is configured to detect a value representing a treatment action taken by a user.

26. The system of claim 25, wherein each of the first set of instructions and the second set of instructions are configured to advance the state of each of the first evolving medical condition and the second evolving medical condition, respectively, based on the value of the at least one input device without further action from the user.

* * * * *